United States Patent [19]
Keck

[11] 3,935,941
[45] Feb. 3, 1976

[54] ADJUSTABLE BELT CONVEYOR

[75] Inventor: Jürgen Keck, Niefern-Oschelbronn, Germany

[73] Assignee: Gebrüder Bellmer KG, Niefern, Germany

[22] Filed: Sept. 4, 1973

[21] Appl. No.: 394,345

[30] Foreign Application Priority Data
Sept. 1, 1972 Germany............................ 2242993

[52] U.S. Cl. ................ 198/139; 198/160; 198/165
[51] Int. Cl.². ......................................... B65G 15/16
[58] Field of Search................... 198/139, 160, 165

[56] References Cited
UNITED STATES PATENTS

| 721,571 | 2/1903 | Kramer................ | 198/139 |
| 2,166,447 | 7/1939 | Ruppenthal.......... | 198/139 |
| 3,142,374 | 7/1964 | Carter.................. | 198/165 |
| 3,216,552 | 11/1965 | Lister................... | 198/139 |
| 3,238,826 | 3/1966 | Crispe.................. | 198/139 |
| 3,556,511 | 1/1971 | Howard et al. ...... | 271/4 |

Primary Examiner—Evon C. Blunk
Assistant Examiner—Jeffrey V. Nase
Attorney, Agent, or Firm—Joseph A. Geiger

[57] ABSTRACT

An adjustable belt conveyor assembly for the feeding of box panels into box making machinery where the friction track, i.e., the distance of advancement is adjustable as a result of a longitudinally adjustable intermediate belt loop in the run of an endless conveyor belt.

8 Claims, 3 Drawing Figures

ADJUSTABLE BELT CONVEYOR

BACKGROUND OF THE INVENTION

Field of the Invention

The present invention relates to belt conveyor assemblies, and in particular to adjustable belt conveyor assemblies such as may be employed in box making machinery where adjustability is required in the conveyor displacement for adaptation to boxes of different size.

SUMMARY OF THE INVENTION

The present invention suggests an adjustable belt conveyor, especially for use in conjunction with box folding machinery, where the advancement of the box panels over a given distance into the folding station is obtained by means of a high-friction conveyor belt which engages the flat box panel against a low-friction stationary slide face, thereby advancing the box panel at the speed of belt motion as long as a portion of the box panel is confined between the belt and the slide face.

This length of belt run over which the belt and the slide face are contiguous, which will be referred to herein as friction track, is made adjustable by the present invention so that the end point of the friction track can be set in accordance with different sizes of box panels. This adjustability is obtained in a most simple manner by providing an intermediate belt loop as part of the endless belt conveyor, the belt loop being adjustable longitudinally so as to present belt strands of variable lengths in conjunction with the fixed belt rollers, one of these variable-length belt strands being used to provide the adjustability for the length of the friction track.

In the preferred embodiment the intermediate belt loop consists of a longitudinal support arm which carries a belt roller or loop roller on each end and which is horizontally adjustable in parallel to the friction track. The endless belt of the conveyor thus runs from a stationary drive wheel over the two loop rollers of the support arm and from there over a second stationary belt roller back to the drive wheel. The intermediate belt loop thus causes the belt to run in three substantially parallel strand portions, two of them running away from the drive wheel in the direction of advance, while one runs in the opposite direction. Thus, when the position of the support arm is longitudinally adjusted toward or away from the drive wheel, one of the two aforementioned belt strands is lengthened, while the other one is shortened by the same amount, without affecting the belt tension.

The support arm for the adjustable intermediate belt loop is preferably so arranged that it is horizontally adjustable along a rail profile by means of a pivot pin which is clampable in any adjustment position relative thereto.

A preferred embodiment of the invention further suggests that the contact pressure exerted by the belt strand and the slide face of the friction track against the box panel is provided by the weight of the support arm and/or by a downwardly directed force component of the belt tension on the strand between the two belt rollers of the intermediate loop, obtained as a result of a slight downward slant of that belt strand.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows.

DESCRIPTION OF THE PREFERRED EMBODIMENT

Figure 1:
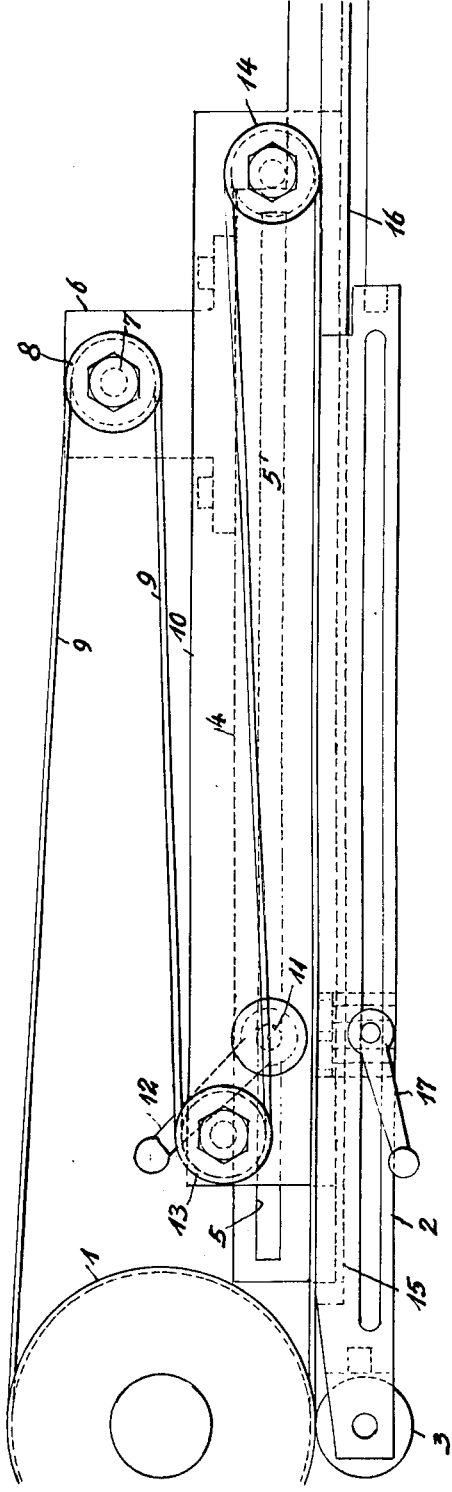
FIG. 1 shows in an elevational view an adjustable belt conveyor embodying the invention.
Figure 2:
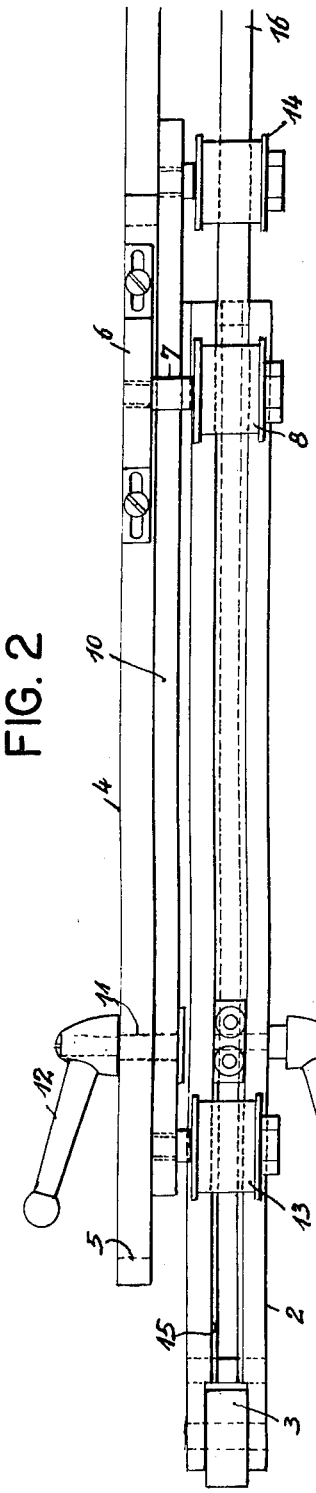
FIG. 2 shows the conveyor assembly of FIG. 1 in a plan view, representing one of several parallel operating conveyor segments

FIGS. 1 and 2 illustrate in elevation and plan view an endless belt conveyor assembly which is especially suitable for the feeding of box panels into paper folding machinery. It should be understood that FIG. 2 only shows a single endless belt, and that two or more of these belts may be arranged in parallel in order to handle large box panels.

In FIG. 1 the belt assembly is shown to include a drive wheel 1 which advances an endless belt 9 with the assistance of a counter roller 3 which is arranged underneath the drive wheel 1. The counter roller is rotatably supported in the forked rear end of a horizontally extending guide profile 2. The latter thus extends from underneath the drive wheel to a forward point on the machine in alignment with the vertical plane defined by the belt run. A rail profile 4 is arranged in parallel and laterally spaced from the guide profile and belt run, the rail profile 4 as well as the guide profile 2 being fixedly mounted to the machine frame (not shown). The rail profile 4 includes a horizontal slot 5 and carries at a distance from the drive wheel a roller block 6 which supports a stationary belt roller 8 by means of a trunnion 7. The roller block 6 is longitudinally adjustable for the purpose of setting the tension of the endless belt 9. As can be seen in FIG. 1, the stationary belt roller 8 is smaller and stationed higher than the drive wheel 1, in order to accommodate underneath it an intermediate belt loop, which will be described in more detail below.

The rail profile 4 carries on its vertical face an elongated support arm 10 which is retained against the rail profile 4 by means of a pivot pin 11. The pivot pin 11 is arranged in the rear portion of the support arm 10 and engages the slot 5 of the rail profile against which it can be fixedly retained in any longitudinal position within the slot 5 by means of a clamping lever 12. The longitudinal position of the support arm 10 is thus adjustable within the range of slot 5 by shifting the position of its pivot pin 11. On the two ends of the support arm 10 are arranged belt rollers or loop rollers 13 and 14 in alignment with the belt run so as to form an intermediate loop in the belt run which is composed of a first advancing belt strand running at the bottom of the belt run between the drive wheel and the loop roller 14, an intermediate returning belt strand running between loop roller 14 and loop roller 13, a second advancing belt strand running between the loop roller 13 and the stationary belt roller 8, and a returning belt strand running at the top of the belt run between the stationary belt roller 8 and the stationary drive wheel 1.

The guide profile 2 has a smooth horizontal upper slide face arranged in parallel to the bottom strand of the endless belt 9 so as to constitute a friction track for the box panel which is engaged between the low-friction slide face and the high-friction belt 9. The friction pressure is controlled by the vertical position of the front loop roller 14 on the support arm 10 and is determined, on the one hand, by the weight of the support 10 and loop roller 14 tending to push the latter downwardly in relation to the pivot pin 11, and on the other hand, by the direction of pull on the intermediate belt strand between the loop rollers 13 and 14 which, in the case illustrated in FIG. 1, is slanted so as to produce an additional downward-directed force component. It should be understood that other means for controlling the friction pressure would likewise be suitable, such as resilient biasing means, like springs etc.

The horizontal adjustability of the support arm 10 and its loop rollers 13 and 14 relative to the stationary rail profile 4 permits repositioning of the intermediate belt loop forwardly and backwardly in relation to the stationary belt roller 8 and drive wheel 1 without any change in the belt tension. This is made possible through the parallel arrangement of the advancing bottom strand with the likewise advancing intermediate belt strand between the rear loop roller 13 and the stationary belt roller 8. Thus, when the support arm 10 is shifted forwardly, the first advancing strand is lengthened while the second advancing strand is accordingly shortened. An adjustment of the support arm 10 away from the drive wheel 1 thus increases the effective length of the friction track.

The guide profile 2 further includes in its upper portion a longitudinal groove 15 inside which is positioned a stop rod 16. The latter is so arranged that it forms a part of the slide face of the guide profile in cooperation with the bottom strand of belt 9. However, the stop rod 16 extends forwardly a distance beyond the length of the guide profile 2 and includes at its forward extremity a positioning abutment (not shown) for the box panel in the folding station. This stop rod 16 is also longitudinally adjustable in relation to the stationary guide profile 2 so as to accommodate various sizes of box panels. The adjustment of the stop rod 16 is accomplished by means of a rod clamp with a clamping lever 17. The rod clamp is arranged at the rear end of the stop rod 16 and cooperates with a longitudinal slot in the guide profile 2.

Figure 3:
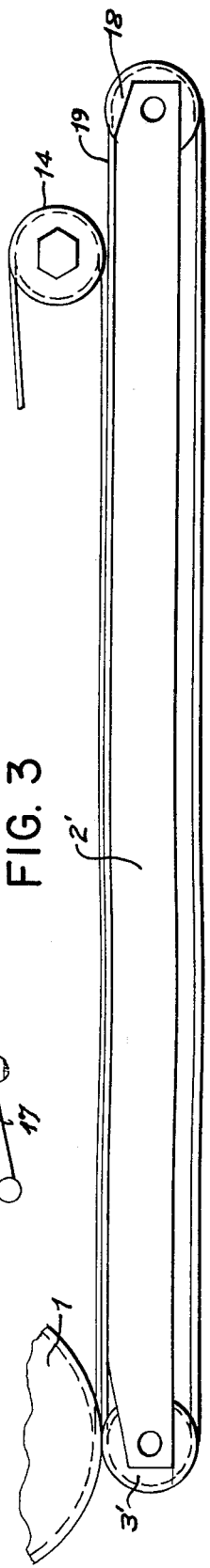
FIG. 3 shows a modified portion of the conveyor of FIG. 1.

Although the friction track of the preferred embodiment as illustrated and described above consists of a simple stationary slide face cooperating with the bottom strand of the endless belt, it should be obvious that a second endless belt may be arranged to run in parallel with the conveyor belt, as shown in FIG. 3, counter belt 19 is guided over the counter roller 3 and a similar roller 18 at the front end of the guide rail 2'. In this case the stop rod 1 is arranged elsewhere on the assembly.

It should be understood, of course, that the foregoing disclosure describes only a preferred embodiment of the invention and that it is intended to cover all changes and modifications of this example of the invention which fall within the scope of the appended claims.

I claim:

1. An adjustable belt conveyor assembly which is adapted for feeding flat workpieces to a forwardly and rearwardly adjustable position in a work station and especially for feeding box panels to the folding station of a box folding machine, the conveyor assembly comprising in combination:
    an elongated stationary support structure which includes a guide profile defining a substantially horizontal conveying surface extending from a rearward point to a forward point on the assembly;
    a first stationary belt roller arranged near the rear of the assembly;
    a second stationary belt roller arranged near the front of the assembly;
    a first intermediate loop roller arranged forward of said first stationary belt roller and having a smaller diameter than the latter;
    a second intermediate loop roller arranged forward of the first intermediate loop roller, at a level below the second stationary belt roller;
    an endless belt engaging said four rollers so as to form four consecutive belt strands as follows: an advancing bottom belt strand extending between the first belt roller and the second loop roller, at the lower side thereof and in parallel cooperative relationship with at least a portion of said conveying surface; a returning lower intermediate belt strand extending between the two loop rollers; an advancing upper intermediate belt strand extending between the first loop roller and the second stationary belt roller; and a returning top belt strand extending between the two stationary belt rollers; whereby said upper intermediate belt strand and said bottom belt strand are substantially parallel to one another;
    means for driving the endless belt; and
    means for simultaneously longitudinally adjusting the two intermediate loop rollers by equal increments, thereby lengthening or shortening said upper intermediate belt strand and correspondingly shortening or lengthening said bottom belt strand, the latter cooperating with the conveying surface of the stationary support to advance a workpiece therebetween to the adjusted position of the first intermediate loop roller; and wherein
    the support structure further includes a rail profile having a longitudinal slot therein; and
    the loop roller adjusting means includes an elongated support arm on which both intermediate loop rollers are mounted at a fixed horizontal spacing, and support arm attaching means extending through said slot for clamping said support arm to said rail profile in any one of the plurality of longitudinal adjustment positions.

2. A conveyor assembly as defined in claim 1, wherein:
    the conveying surface is an advancing horizontal upper strand of an endless counter belt, the guide profile including means for guiding said counter belt.

3. A conveyor assembly as defined in claim 1, wherein:
    the conveying surface is a smooth stationary slide face having a friction coefficient which is substantially lower than that of the cooperating side of the endless belt.

4. A conveyor assembly as defined in claim 1, wherein:
    the support arm attaching means is arranged in the rear portion of the support arm and includes a horizontal-axis pivot connection carrying the support arm, so as to render the first intermediate loop roller adjustable vertically about said pivot connection for an adjustment of the pressure exerted against the workpiece between the bottom belt strand and the conveying surface.

5. A conveyor assembly as defined in claim 4, wherein:

the lower intermediate belt strand returns at a downward slant in relation to the bottom belt strand.

6. A conveyor assembly as defined in claim 4, wherein:

the support arm carrying the two intermediate loop rollers includes means for biasing the first intermediate loop roller downwardly against the conveying surface.

7. An adjustable belt conveyor assembly which is adapted for feeding flat workpieces to a forwardly and rearwardly adjustable position in a work station and especially for feeding box panels to the folding station of a box folding machine, the conveyor assembly comprising in combination:

an elongated stationary support structure which includes a guide profile defining a substantially horizontal conveying surface extending from a rearward point to a forward point on the assembly;

a first stationary belt roller arranged near the rear of the assembly;

a second stationary belt roller arranged near the front of the assembly;

a first intermediate loop roller arranged forward of said first stationary belt roller and having a smaller diameter than the latter;

a second intermediate loop roller arranged forward of the first intermediate loop roller, at a level below the second stationary belt roller;

an endless belt engaging said four rollers so as to form four consecutive belt strands as follows: an advancing bottom belt strand extending between the first belt roller and the second loop roller, at the lower side thereof and in parallel cooperative relationship with at least a portion of said conveying surface; a returning lower intermediate belt strand extending between the two loop rollers; an advancing upper intermediate belt strand extending between the first loop roller and the second stationary belt roller; and a returning top belt strand extending between the two stationary belt rollers; whereby said upper intermediate belt strand and said bottom belt strand are substantially parallel to one another;

means for driving the endless belt; and means for simultaneously longitudinally adjusting the two intermediate loop rollers by equal increments, thereby lengthening or shortening said upper intermediate belt strand and correspondingly shortening or lengthening said bottom belt strand, the latter cooperating with the conveying surface of the stationary support to advance a workpiece therebetween to the adjusted position of the first intermediate loop roller; and wherein the conveying surface is a smooth stationary slide face, having a friction coefficient which is substantially lower than that of the cooperating side of the endless belt; and the guide profile includes a longitudinal groove in said slide face and a longitudinally adjustable rod received within the groove so as to be flush with the slide face and forming a longitudinal extension thereof.

8. A conveyor assembly as defined in claim 7, wherein:

the adjustable rod includes a workpiece stop at its forward end and a fastening means near its rear end by which it is longitudinally retainable in the guide profile in any one of a plurality of longitudinal adjustment positions.

* * * * *